(12) United States Patent
Mevert et al.

(10) Patent No.: US 9,528,225 B2
(45) Date of Patent: Dec. 27, 2016

(54) METHOD AND APPARATUS FOR MACHINING A WORKPIECE BY WAY OF A GEOMETRICALLY DEFINED BLADE

(75) Inventors: Frank Mevert, Lauenhagen (DE); Kurt Sander, Bueckeburg (DE)

(73) Assignee: SCHWEERBAU GMBH & CO. KG, Stadthagen (DE)

( * ) Notice: Subject to any disclaimer, the term of this patent is extended or adjusted under 35 U.S.C. 154(b) by 889 days.

(21) Appl. No.: 13/123,927

(22) PCT Filed: Oct. 13, 2009

(86) PCT No.: PCT/DE2009/001417
§ 371 (c)(1),
(2), (4) Date: Apr. 13, 2011

(87) PCT Pub. No.: WO2010/045919
PCT Pub. Date: Apr. 29, 2010

(65) Prior Publication Data
US 2011/0243678 A1  Oct. 6, 2011

(30) Foreign Application Priority Data
Oct. 20, 2008  (EP) ..................................... 08018311

(51) Int. Cl.
*B23D 13/04* (2006.01)
*E01B 31/13* (2006.01)
*B23D 13/00* (2006.01)

(52) U.S. Cl.
CPC ............... *E01B 31/13* (2013.01); *B23D 13/04* (2013.01); *B23D 13/00* (2013.01);
(Continued)

(58) Field of Classification Search
CPC ......... B23D 13/00; B23D 13/02; B23D 13/04;
B23D 13/06; E01B 31/15; B23B 29/03432; B23B 29/03478; B23B 29/03482; B23B 29/03489; B23B 29/03492; B23B 29/03457; B23B 29/03446
(Continued)

(56) References Cited

U.S. PATENT DOCUMENTS 1,797,296 A * 3/1931 Ray ................................ 403/259
2,424,524 A * 7/1947 Weimer .......................... 82/19
(Continued)

FOREIGN PATENT DOCUMENTS

AT  396764 B  11/1993
AT  400 863 B  4/1996
(Continued)

OTHER PUBLICATIONS

Declaration/letters cited by Linsinger Maschinenbau GmbH in Opposition Proceedings before the European Patent Office regarding corresponding European Patent No. EP2177664 B1, pp. 1-11, Oct. 18, 2012.

*Primary Examiner* — Daniel Howell
(74) *Attorney, Agent, or Firm* — Leydig, Voit & Mayer, Ltd.

(57) ABSTRACT

A method for stock-removal machining of a surface of a workpiece includes driving a carrier revolvingly about an axis so as to move at least one geometrically defined cutter disposed on the carrier via a receiver on a revolution path about the axis; and moving the cutter relative to the carrier during the machining, so that the cutter moves in a straight path relative to the surface of the workpiece.

10 Claims, 4 Drawing Sheets

(52) U.S. Cl.
CPC ............... *Y10T 409/303752* (2015.01); *Y10T 409/309184* (2015.01); *Y10T 409/509676* (2015.01)

(58) Field of Classification Search
USPC ..... 409/347, 348, 134; 82/1.2–1.4; 408/157, 408/160, 164, 179, 150–151
See application file for complete search history.

(56) References Cited

U.S. PATENT DOCUMENTS

| | | | | |
|---|---|---|---|---|
| 2,727,438 | A | * | 12/1955 | Gack ............................ 409/313 |
| 3,183,779 | A | * | 5/1965 | Nagel ........................... 409/319 |
| 3,530,745 | A | * | 9/1970 | Milewski ...................... 408/158 |
| 3,628,629 | A | | 12/1971 | Phillips |
| 3,822,618 | A | * | 7/1974 | Tomenceak ....................... 82/18 |
| 4,275,499 | A | | 6/1981 | Bommart |
| 4,295,764 | A | | 10/1981 | Theurer et al. |
| 4,452,553 | A | * | 6/1984 | Kaminsky ..................... 408/162 |
| 4,484,845 | A | * | 11/1984 | Pennella et al. ............. 409/134 |
| 4,490,947 | A | | 1/1985 | Theurer et al. |
| 4,583,893 | A | | 4/1986 | Line |
| 4,583,895 | A | | 4/1986 | Theurer |
| RE32,211 | E | * | 7/1986 | Jerue et al. ....................... 82/1.2 |
| 4,692,989 | A | | 9/1987 | Neubauer |
| 4,790,221 | A | * | 12/1988 | Iwata et al. ..................... 82/1.11 |
| 5,344,260 | A | * | 9/1994 | Suzuki et al. ................. 408/168 |
| 5,549,505 | A | | 8/1996 | Jaeggi |
| 5,566,437 | A | | 10/1996 | Jaeggi |
| 5,846,036 | A | * | 12/1998 | Mizoguchi .................... 409/134 |
| 6,725,515 | B2 | | 4/2004 | Lotz |
| 6,746,307 | B2 | | 6/2004 | Knoll et al. |

FOREIGN PATENT DOCUMENTS

| | | | | |
|---|---|---|---|---|
| DE | 286101 | C | | 7/1915 |
| DE | 1045275 | B | * 11/1958 | ........... B23Q 1/4809 |
| DE | 7005215 | U | | 5/1973 |
| DE | 2405694 | A | * | 8/1975 |
| DE | 28 01 110 | A1 | | 8/1978 |
| DE | 28 41 506 | C2 | | 7/1979 |
| DE | 2848230 | A | * | 5/1980 |
| DE | 80 34 887 | U1 | | 4/1981 |
| DE | 32 27 343 | A1 | | 6/1983 |
| DE | 32 22 208 | C2 | | 3/1985 |
| DE | 3502192 | A | * | 7/1986 |
| DE | 3502346 | A | * | 7/1986 |
| DE | 3524123 | A1 | | 2/1987 |
| DE | 3918032 | A | * | 12/1990 |
| DE | 102005028366 | A1 | * | 12/2006 |
| DE | 102006008093 | A1 | | 9/2007 |
| EP | 0 668 397 | B1 | | 8/1995 |
| EP | 0 668 398 | B1 | | 5/1998 |
| EP | 0 952 255 | B1 | | 9/2004 |
| EP | 1 918 458 | A1 | | 5/2008 |
| GB | 1576192 | A | | 10/1980 |
| GB | 2121710 | A | | 1/1984 |
| JP | 5621712 | A | | 2/1981 |
| JP | 62124811 | A | * | 6/1987 |
| JP | 62124814 | A | * | 6/1987 |
| JP | 2002045954 | A | | 2/2002 |
| JP | 2002172541 | A | * | 6/2002 |
| WO | WO 9319878 | A1 | * | 10/1993 |
| WO | WO 9520071 | A1 | | 7/1995 |
| WO | WO 0206587 | A1 | | 1/2002 |

\* cited by examiner

METHOD AND APPARATUS FOR MACHINING A WORKPIECE BY WAY OF A GEOMETRICALLY DEFINED BLADE

CROSS REFERENCE TO PRIOR APPLICATIONS

This application is a U.S. National Phase Application under 35 U.S.C. §371 of International Application No. PCT/DE2009/001417, filed on Oct. 13, 2009, and claiming priority to European Application No. EP 08 018 311.4, filed on Oct. 20, 2008. The International Application was published in German on Apr. 29, 2010 as WO 2010/045919 under PCT Article 21 (2).

FIELD

The invention relates to a method for the stock-removing machining of a workpiece, in particular rails of a track body, wherein at least one geometrically defined cutter is moved on a revolution path about an axis. The invention furthermore relates to an apparatus having a geometrically defined cutter for the stock-removing machining of a workpiece, in particular rails of a track body, which apparatus has a revolvingly drivable carrier on which the cutter is disposed by means of a receiver.

BACKGROUND

A workpiece within the meaning of the invention is a body to be machined, having a substantially flat surface for machining. The workpiece can be an elongate body that has a defined cross-sectional geometry. The workpiece within the meaning of the invention can be composed of differing materials, for example plastic or wood, but also, in particular, of steel. Such workpieces are used for differing purposes in all technical fields. To be considered in greater detail here, by way of example, is the application of a workpiece as a rail of a track body.

Workpieces have to be machined as part of their production. Frequently in this case, particular attention is paid to an exact cross-sectional geometry. Moreover, the creation of a flat and/or planar surface is important. It is precisely in the case of a workpiece subjected to mechanical stress—such as a rail of a track body—that the cross-sectional geometry and the surface must be restored regularly.

There are numerous known stock-removing methods of machining by means of a geometrically defined cutter, for example planing and milling, for creating a planar surface of a workpiece. Usually in such cases, the workpiece is moved through and/or past the apparatus for machining the workpiece. For machining of workpieces of indeterminate length, such as rails, the apparatus for machining the workpiece is usually moved along and/or on the stationary workpiece.

Usually, for the purpose of machining such a workpiece, apparatuses are used that have a milling cutter driven in rotation, as described in DE 10 2006 008 093 A1. The milling cutter has a set of cutters for milling a rail head, the cross-sectional geometry of which cutters is composed of approximately circular partial arcs of various radii, each partial arc forming a trace on the running surface of the track rail. The multi-trace milling cutter has a plurality of rectilinear cutter elements, next to one another, which are adapted to the contour of the rail head, and which enable the entire contour to be machined in one operation. The individual cutters can also be disposed in a mutually offset manner on the milling cutter. WO 02/06587 A1 also describes a method for reprofiling at least the travel surface of a rail, preferably of the convex part of the rail-head cross-sectional profile of a rail, in particular of a railway rail, that comprises the travel surface, through circumferential milling with more than five milling traces next to one another in the longitudinal direction of the rail. Further apparatuses for stock-removing remachining, in particular for the milling of rail heads laid in the track, are described in the publications EP 0 952 255 B1, U.S. Pat. No. 4,583, 893, U.S. Pat. No. 5,549,505, EP 0 668 398 B1, EP 0 668 397 B1, U.S. Pat. No. 4,275,499, DE 32 22 208 C2, WO 95/20071 A1 and DE 80 34 887 U1. Disadvantageous in the case of milling are the machining traces that occur on the machined surface, for example undulations and/or corrugations.

In contrast thereto, apparatuses are known wherein the rail heads are machined by means of a so-called rail plane. The publication DE 28 41 506 C2 discloses such an apparatus, wherein stock-removing blades machine the rail in a continuous advance motion. Owing to the great removal depth, a rail plane removes irregularities, even on highly corrugated rail portions, with a high working accuracy. By means of planing, planar surfaces can be produced that, compared with milling, have only negligible remaining machining traces. Disadvantageous in the case of planing, particularly compared with the milling methods, are the lesser advance speed, a greater force requirement in the direction of advance, a long chip and/or the frequently longer downtimes.

For this reason, at present it is usual for rails to be machined initially, in a first operation, by means of a milling cutter. Subsequently, in a further operation, the machining traces that occur on the machined surface during milling, such as undulations and/or trace patterns, are then reduced by grinding. Apparatuses for grinding are described in the publications U.S. Pat. No. 4,583,895 A1, DE 32 27 343 A1, DE 28 01 110 A1 and EP 1 918 458 A1.

The publication AT 400 863 B describes an apparatus for the stock-removing remachining of a rail by means of a revolving tool guided along the machining strip, wherein the cutters are held in carriers that constitute links of a link chain guided endlessly around deflection wheels.

SUMMARY OF THE INVENTION

An aspect of the invention provides a possibility of machining the surface of a workpiece, in a stock-removing manner, in one operation and with a high advance speed, in such a way that the surface is planar and has extremely insignificant machining traces such as undulations and/or trace patterns. A further aspect of the invention involves improving the machining of a workpiece, in particular of a rail of a track body, in comparison with the disadvantages of the prior art.

There is thus provided, according to the invention, a method for the stock-removing machining of a workpiece, wherein the cutter is moved along a straight path during the stock-removing machining of the workpiece. This makes it possible for the surface of the workpiece to be remachined at a high advance speed without the occurrence of undulations. In this case, the advantages of planing are combined with the advantages of milling. The cutter, which revolves as in the case of milling, can be moved at a high speed relative to the workpiece. The rectilinear motion of the cutter during the stock-removing machining results in a machining of the workpiece that resembles planing. In this combination, a high advance speed can be achieved, with a small force requirement and a high removal rate, in one operation, the surface of the machined workpiece being planar and without undulations. With this rotary planing method, a remachining operation, for example a grinding operation, is unnecessary. The uninterrupted rotary planing allows face machining of a workpiece of theoretically endless length and of any cross-sectional geometry.

It is favourable that the motion of the cutter on the revolution path of the carrier is overlaid by a further motion, which increases the distance of the cutter from the axis. It is thereby possible for the milling motion of the cutter to be realized at high revolution speeds and with a large force absorption. Owing to the overlaid motion applied to the cutter, at least locally, in the machining region, the cutter is moved parallelwise in relation to the direction of advance of the tool. In the case of the overlaid motion, the cutter is swivelled, rotated and/or displaced relative to the revolving motion. In the case of the motion overlaid with the revolving motion, the cutter is displaced, in particular linearly, in the direction of the workpiece. The motion of the cutter parallelwise in relation to the direction of advance is effected in the same direction or in the opposite direction.

It is favourable that, by means of the overlaying, further motion, the cutter is moved out of the revolution path of the carrier. This makes it possible for the cutter to be in engagement with the workpiece for a longer period of time than in the case of an exclusively rotating motion of the cutter. At the same time, it becomes possible to influence the engagement depth of the cutter locally and individually. Thus, the engagement of the cutter can be altered or interrupted without interrupting the revolution.

It is favourable that, in the motion on the revolution path, the carrier is moved about an axis in a rotary manner and/or on a circular path. A rotary revolving motion on a circular path is particularly favourable, both in its effect upon the work performance and the work result, and in its technical feasibility.

There is thus provided, according to the invention, an apparatus having a geometrically defined cutter for the stock-removing machining of a workpiece, wherein the cutter, with the receiver, is disposed on the carrier so as to be movable relative to the carrier. This makes it possible for the cutter to be movable at a high speed relative to the workpiece, with a small force requirement, by means of the revolving motion of the driven carrier and, at the same time, to be moved, at least intermittently, parallelwise in relation to the surface of the workpiece. This allows a chip removal that, as in the case of the generally known planing, produces a planar surface without undulations on the workpiece. Such an apparatus can machine workpieces of virtually endless length, for example rails of a track body, without interruption. Interruptions in the advance are unavoidable because of inevitable wear of the cutter. It is favourable that the cutter can be fixed to the receiver and/or to the carrier in a detachable manner. This enables the interruptions for servicing and repair of the apparatus, in particular of the cutters, to be short.

It is advantageous that the apparatus has an actuating body, by which the cutter and/or the receiver can be deflected out of the revolution path of the carrier. This makes it possible for the overlaid motion of the cutter to be independent of the revolving motion of the carrier of the cutter. It is favourable in this case that the receiver can be set, in particular in its length. This makes it possible to adjust the distance between the axis of the carrier and the cutter, in particular in a neutral position of the cutter.

For mechanical realization, it has proved favourable that the carrier is realized as a body, in particular as a wheel or disc, that can be moved in a rotatory manner, on a circular path, about an axis. This enables the cutter to exert large forces upon the workpiece with a small expenditure of energy and to be moved at a high revolution speed. The cutter in this case is disposed on the outer circumference of the carrier. This configuration has already proved successful in the case of the so-called hobbing cutters.

It is favourable that the actuating body is disposed, within the revolution path of the carrier, such that it can be applied to the carrier in a sliding and/or freely rolling manner. This enables the actuating body to act, at least indirectly, upon the cutter, without being connected to the apparatus, in particular to the drive of the carrier, via an elaborate mechanism. The actuating body is therefore independent of the motion of the carrier and of the cutter. The actuating body constitutes a thrust bearing for the cutter, the respective distance of the actuating body from the carrier being settable. This makes it possible to set the engagement of the cutter and/or to block out the cutter—without interruption of the revolution—for the machining of the workpiece. In the remachining of rails of a track body, for example, certain portions of the surface of the workpiece may not be machined in the region of points. An interruption of the continuous advance of the apparatus is prevented by such blocking-out of the cutter. An actuating body disposed in a freely rolling manner on the carrier has a particularly low wear.

An advantageous development of the invention is that the apparatus has a plurality of actuating bodies, whose respective distance from the carrier can be set independently of one another. This makes it possible, in the case of an apparatus having a plurality of cutters disposed next to one another, for some of the cutters to be set in their engagement and/or blocked out, independently of adjacent cutters. This settability can be realized particularly easily if the actuating body is disposed on an eccentric shaft.

For the purpose of generating a further motion that overlays the revolving motion of the cutter, it is favourable that the receiver is realized as a plunger that has a cam. This enables the cutter to be deflected out of the revolution path of the carrier, without action upon the carrier. By means of the cam, the receiver can be deflected upon the cam coming into contact with the actuating body. The axis of motion of the receiver is inclined relative to the tangent of the revolution path of the carrier. Precisely, the axis of motion is not parallel to the tangent of the revolution path of the carrier.

It is advantageous that the engagement depth of the cutter can be altered, by means of the settable actuating body, during the machining of the workpiece. This enables the apparatus to be adaptable to a changed cross-sectional geometry of the workpiece without time-consuming tool changing. The alteration of the engagement depth of individual cutters enables the cross-sectional geometry of the workpiece to be altered continuously during the machining operation.

The carrier guides the receiver, with the cutter, past the actuating body, the cam pressing against the actuating body. Since the actuating body does not yield to the cam, the cutter can be deflected out of the revolution path of the carrier as a result of a contact between the cam and the actuating body. The contact between the cam and the actuating body causes the receiver, and therefore also the cutter, to be moved out of the revolution path of the carrier. The geometry of the cam in this case is adapted to the desired motional sequence of the cutter. It is advantageous that the cutter can be detachably fixed to the cutter. The receiver has a restoring device, which is realized as a spring and/or a fluid body to which pressure is applied. By means of the restoring device, a force directed against the actuating body can be exerted upon the receiver. The actuating body can be realized as a rolling stop. This makes it possible for there to be less wear on the actuating body, on the cams, and therefore also on the cutter. An improved concentricity of the carrier, with a lesser concentricity error, is made possible by the actuating body.

It is favourable that a multiplicity of cutters are disposed in series and/or next to one another, in particular offset in relation to one another, on the carrier. Through a plurality of cutters disposed in series, it is possible to reduce the wear of the individual cutters, and thus to prolong the period of use of the apparatus between two service interruptions. A plurality of cutters disposed next to one another, in particular in an offset manner, make it possible for the machined surface not to have any trace patterns. One operation is therefore sufficient to produce a flat-planed surface of the workpiece. A remachining operation such as, for example, grinding, is not necessary. For the purpose of shortening the servicing and repair work, it is advantageous that the carrier is constructed from a plurality of segments and/or rings, a plurality of cutters, with the receivers assigned thereto being disposed on a segment and/or ring. Individual rings and/or segments and/or, at the same time, a plurality thereof connected to one another can be removed from the apparatus for servicing and/or repair work. This enables individual cutters and/or receivers, and/or a plurality thereof, to be exchanged within a short period of time.

It is favourable that the apparatus and the workpiece are movable relative to one another. The apparatus in this case can be moved on the workpiece realized, in particular, in the form of rails of a track body. This enables the apparatus to be integrated into a vehicle, in particular a track vehicle, and/or the apparatus to be designed as such a vehicle. By means of an apparatus fashioned thus, it is possible for even stationary workpieces to be machined in a rapid and precise manner.

It is advantageous that the apparatus has a casing. This enables the apparatus to be protected against soiling and/or damage by external influences.

It is advantageous that the cutters disposed next to one another and/or in series are realized according to the cross-sectional geometry of the workpiece. This enables a workpiece having a complex cross-sectional geometry to be machined by means of the apparatus. Geometrically defined cutters allow machining of differing cross-sectional geometries such as straight lines, curves and/or polygons. Owing to the fact that the magnitude of the deflection of the individual cutters can be set, it is possible to vary the cross-sectional geometry of the workpiece during the machining operation. It thereby becomes possible to influence also the geometry of the workpiece in its longitudinal axis.

BRIEF DESCRIPTION OF THE DRAWINGS

The invention allows various embodiments. To further elucidate its basic principle, one of the embodiments is represented in the drawing and described in the following. In the drawing

DETAILED DESCRIPTION

Figure 1:
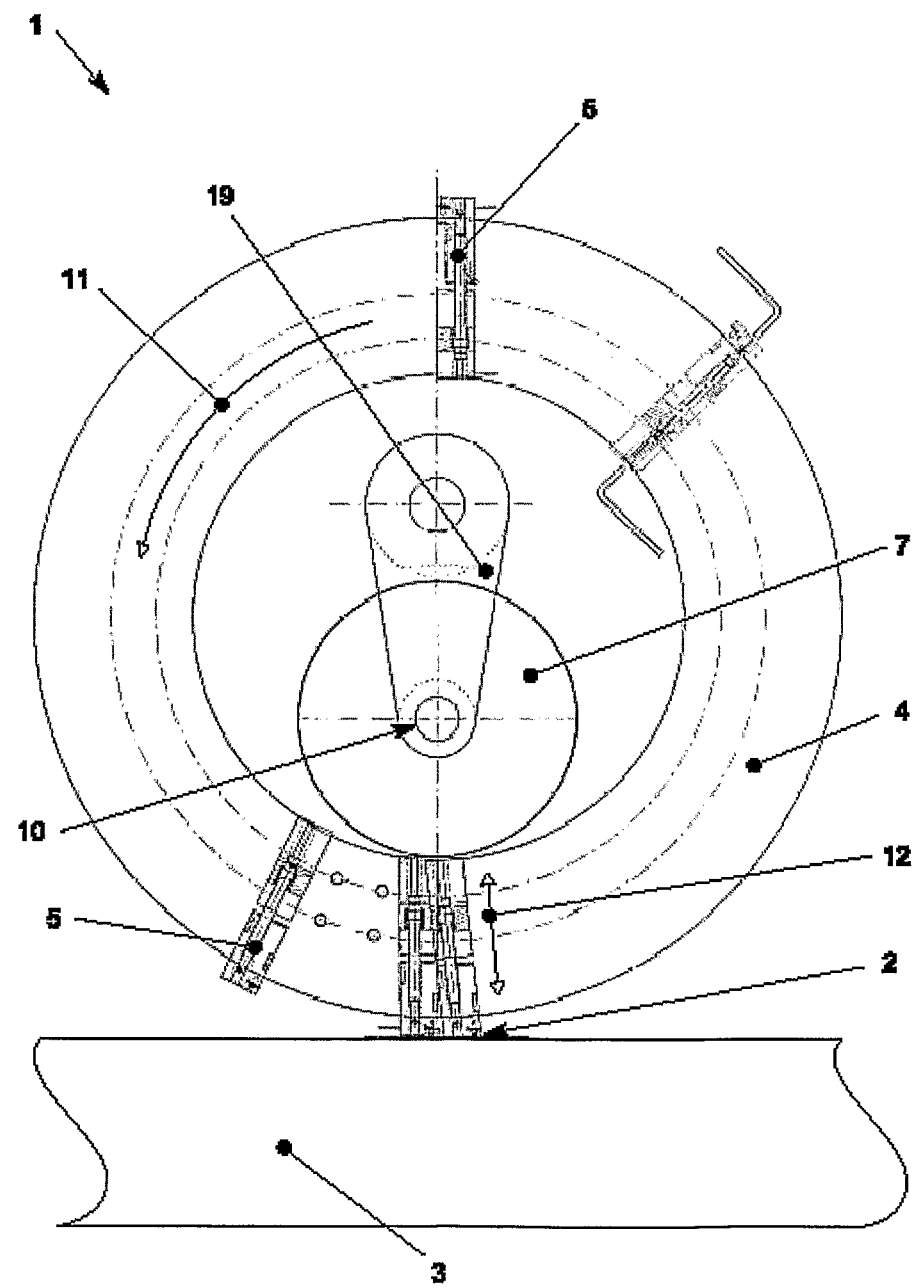
FIG. 1 shows a side view of the apparatus, in a schematic representation.
Figure 2:
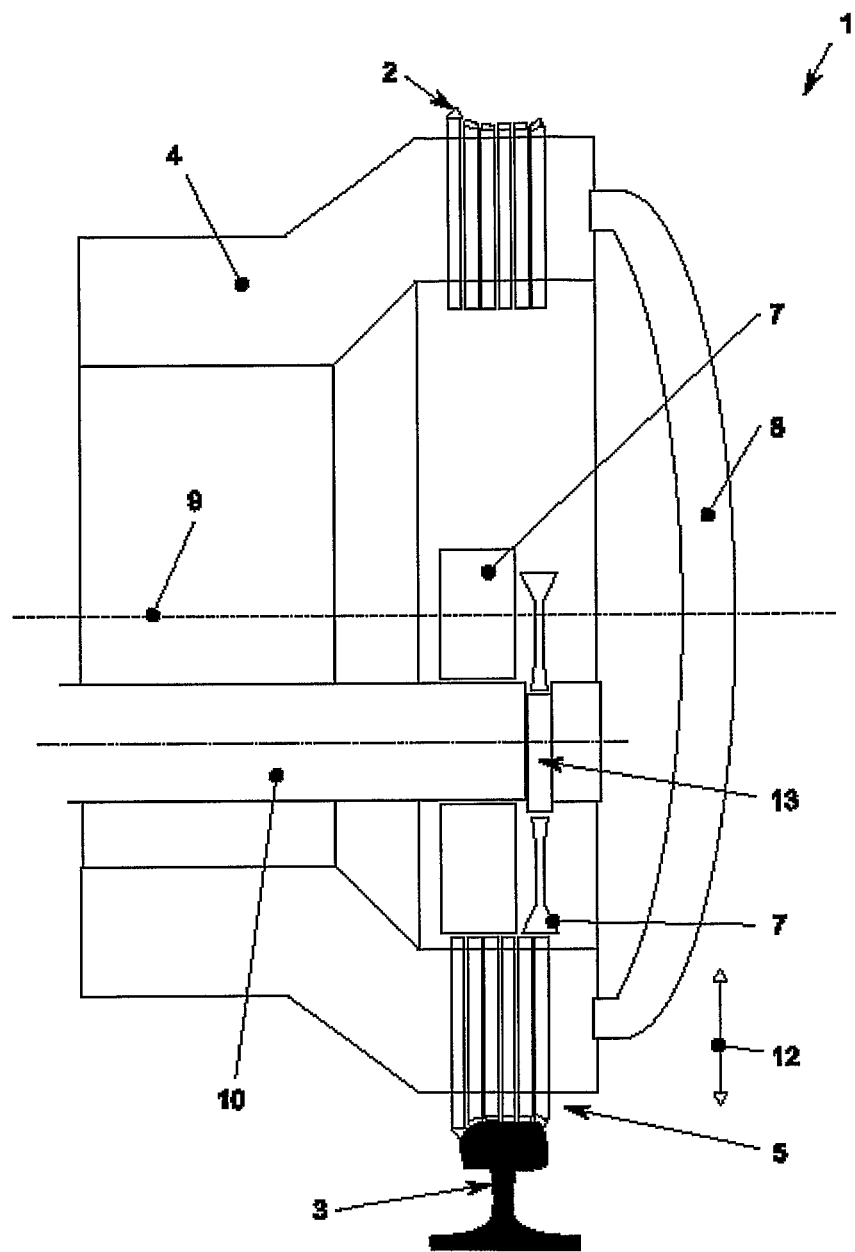
FIG. 2 shows a sectional representation of the apparatus shown in FIG. 1.
Figure 3:
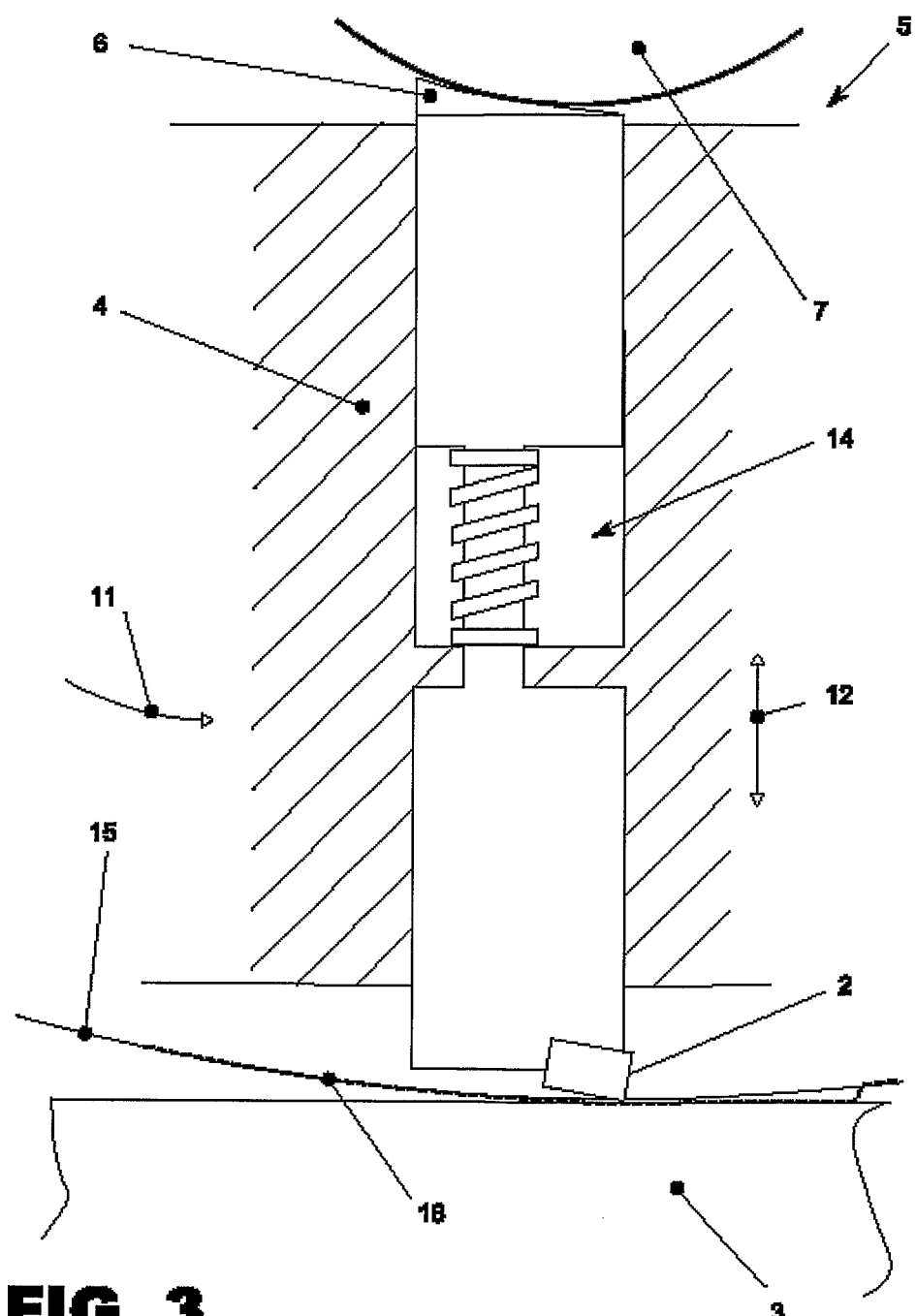
FIG. 3 shows a sectional representation of a receiver of the apparatus, in an enlarged portion of the apparatus represented in FIG. 1.

FIGS. 1 to 3 show an apparatus 1 having a geometrically defined cutter 2 for the stock-removing machining of a workpiece 3. The workpiece 3 represented in section in this drawing is a rail of a track body. The apparatus 1 serves to machine the workpiece 3. In the case of a rail, after a certain period of operation and/or if wear occurs, it is necessary to rework, i.e. to smooth, the surface, to machine off running-surface material, in order to remove hairline cracks and/or restore the cross-sectional geometry. Particular attention in this case is paid to the creation of a surface that is as smooth as possible, in particular in the region of the wheel run. The machining of the workpiece 3 is effected by means of a cutter 2, which, by means of a receiver 5, is disposed on a carrier 4 that can be driven revolvingly about the axis 9. A casing 8 prevents dirt and foreign bodies from entering the apparatus 1 and damaging the latter. To enable servicing work to be performed speedily, the casing 8 can be fixed in a detachable manner, by means of screws.

In the exemplary embodiment shown in FIG. 3, the cutter 2 is moved on a circular revolution path 15, according to the arrow 11, by the carrier 4. This motion of the cutter 2 corresponds to the motion in the case of a hobbing cutter. According to the invention, the cutter 2, with the receiver 5, is movably disposed on the carrier 4, the cutter 2 and the receiver 5 being movable relative to the carrier 4. A motion of the receiver 5 causes the cutter to be moved parallelwise in relation to the surface of the workpiece 3 over a certain period of time. A motion of the cutter 2 parallelwise in relation to the surface of the workpiece 3 corresponds to the motion of a plane known from the prior art. This intermittent parallel motion of the cutter 2 is achieved by overlaying the revolving motion with a motion of the cutter 2 out of the revolution path of the carrier. The latter motion is indicated by the arrow 12. The overlaying of the motions indicated by the arrows 11 and 12 results in the path of the working motion 16 of the cutter 2 that is indicated by a broken line in FIG. 3.

Figure 4:
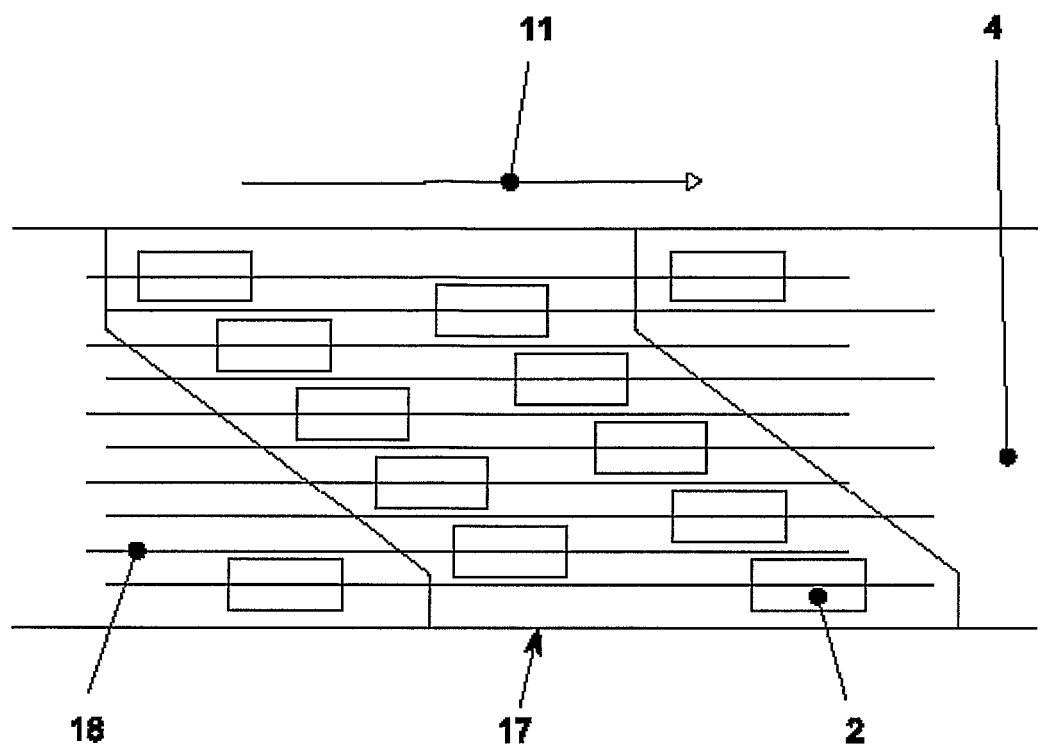
FIG. 4 shows a view of the disposition of a plurality of cutters on the apparatus shown in FIG. 1.

The apparatus has a plurality of cutters 2, each detachably fastened to a receiver 5. A multiplicity of receivers 5 are disposed in series, as represented in FIG. 1, and next to one another, as represented in FIG. 4, over the circumference of the carrier 4. A receiver 5, realized as a plunger, is represented in detail in FIG. 3. The receiver 5 is movably disposed in the carrier 4 and has a cam 6. During the revolution of the carrier 4, the cam 6 of the receiver 5 is moved past an actuating body that is rotatable in a non-displaceable, but free manner. Upon a contact between the actuating body and the cam 6, the receiver 5 is moved away from an actuating body 7 in accordance with the geometry of the cam 6. This motion is indicated by the arrow 12. The receiver 5 has a restoring device 14. When the cam 6 is no longer in contact with the actuating body 7, the receiver 5 is moved into its initial position by the restoring device 14.

FIG. 2 shows a section through the apparatus 1. The carrier 4 rotating about an axis 9 has numerous adjacently disposed receivers 5 going around. For the purpose of machining the workpiece 3, the cutters 2 fastened to the receivers 5 are moved—by the actuating body 7 acting upon the receiver 5—with the receivers 5 in the direction of the workpiece 3. In the embodiment shown, the apparatus 1 has two actuating bodies 7 disposed on a shaft 10 such that they are freely rotatable independently of one another. The forces taken up by the actuating bodies 7 for the purpose of displacing the cutters 2 are removed via the shaft 10. The shaft 10 is connected to the apparatus 1 via a clip 19. The clip 19 represented in FIG. 1 supports the shaft 10 against yielding under the action of force.

The actuating body 7 that faces towards the casing 8 is disposed in a freely rotatable manner on an eccentric region 13 of the shaft 10. This is shown by FIG. 2. The shaft 10 is movable in rotation. Turning of the shaft 10—for example, by 180°—causes the position of the eccentric region 13 to be altered in such a way that the actuating body 7 disposed on the eccentric region 13 can no longer act upon the receivers 5 assigned to this actuating body 7. These receivers 5 are no longer displaced, as a result of which the cutters 2 of these receivers 5 no longer machine the workpiece 3, while the other cutters 2 continue to machine the workpiece 3. However, it is not only blocking out of individual cutters 2 that is made possible by the displacement of the eccentric region 13. If the shaft 10 is rotated only by a small amount, for example by 20°, the engagement of the cutters 2 in the workpiece 3 is reduced, but not interrupted. Thus, it is possible for the cross-sectional geometry of the workpiece 3 to be varied during and/or by means of the machining with the apparatus 1.

FIG. 4 shows a portion of the face surface of the carrier 4 having a plurality of cutters 2 disposed in series and next to one another. The cutters 2 are disposed on mutually offset trace paths 18, in order to prevent trace patterns on the machined surface of the workpiece 3 represented in FIGS. 1 to 3. The carrier 4 moved in the direction of the arrow 11 is composed of individual segments 17. The segments 17 can be detachably fixed to one another to form a carrier 4. The division of the carrier 4 into segments 17 allows rapid changing of the cutters 2.

The invention claimed is:

1. An apparatus for stock-removal type machining of a workpiece comprising:
   a geometrically defined cutter;
   a receiver configured to receive the cutter, the receiver having a cam;
   a revolvingly drivable carrier, wherein the receiver with the cutter is disposed on the carrier such that the cutter is moveable relative to the carrier and wherein the revolving drivable carrier is revolvingly driveable about a revolution path;
   a settable actuating body configured to contact the cam so as to deflect at least one of the cutter or the receiver out of the revolution path to a path substantially parallel to the workpiece, wherein a distance between the actuating body and the carrier is independently settable during the machining of the workpiece; and
   a restoring device biasing the cutter or the receiver toward the actuating body so as to return the cutter or receiver to the revolution path,
   wherein the settable actuating body is configured to alter an engagement depth of the cutter relative to the carrier during the machining.

2. The apparatus as recited in claim 1, wherein the workpiece includes at least one rail of a track body.

3. The apparatus as recited in claim 1, wherein the carrier includes one of a wheel and a disc.

4. The apparatus as recited in claim 1, wherein the actuating body is disposed inside the revolution path and is configured to be at least one of slidingly and rollingly applied to the carrier.

5. The apparatus as recited in claim 1, wherein the receiver includes a plunger with the cam.

6. The apparatus as recited in claim 1, further comprising a plurality of additional cutters disposed in series on the carrier.

7. The apparatus as recited in claim 6, wherein the plurality of additional cutters are disposed offset relative to one another on the carrier.

8. The apparatus as recited in claim 1, wherein the apparatus is movable relative to the workpiece.

9. The apparatus as recited in claim 1, further comprising a casing.

10. The apparatus as recited in claim 7, wherein the additional cutters are disposed relative to each other according to a cross-sectional geometry of the workpiece.

* * * * *